W. A. LYTTLE.
MANUFACTURE OF IRON AND STEEL DIRECT FROM THE ORE.
No. 183,691.            Patented Oct. 24, 1876.
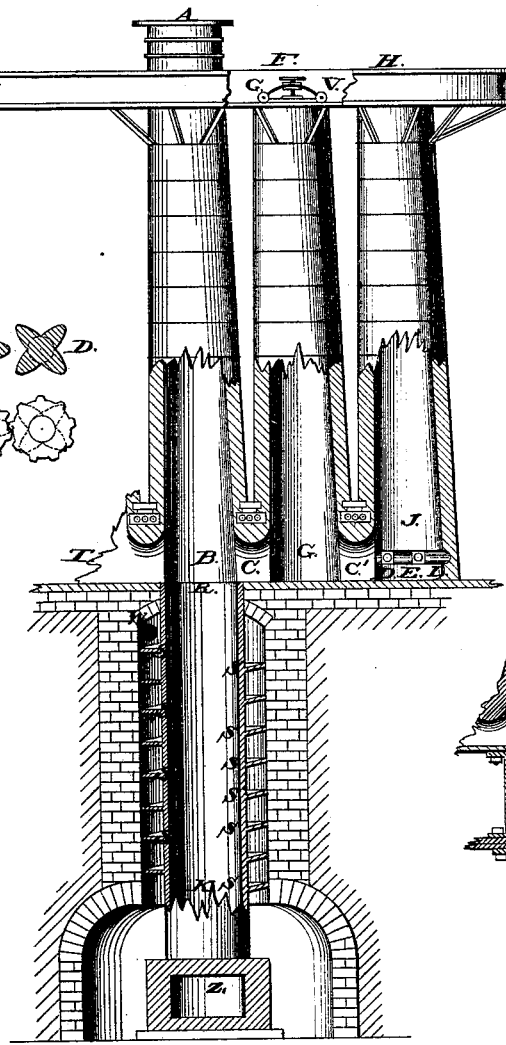

UNITED STATES PATENT OFFICE.

WILLIAM A. LYTTLE, OF THE GROVE, HAMMERSMITH, ENGLAND.

IMPROVEMENT IN THE MANUFACTURE OF IRON AND STEEL DIRECT FROM THE ORE.

Specification forming part of Letters Patent No. 183,691, dated October 24, 1876; application filed May 7, 1875.

*To all whom it may concern:*

Be it known that I, WILLIAM ALEXANDER LYTTLE, of The Grove, Hammersmith, in the county of Middlesex, England, civil engineer, have invented an improvement in the production and separation of iron, steel, and other metals in pulverulent form direct from their ores, and apparatus for that purpose; and do hereby declare that the following description, taken in connection with the accompanying plate of drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention relates to an improved process and apparatus for producing iron and other metals in a pulverulent condition direct from their ores, and separating the products from the earthy matters with which they are mingled, the same process and apparatus being applicable in the conversion of iron so produced into steel.

According to the said process, which I will first describe as applied to the reduction of iron, I employ ore in a pulverulent condition, or I reduce the ore to powder; and, in order to facilitate such reduction in some cases, I heat or roast the ore, and plunge it, while hot, into water, so that it becomes partially disintegrated. I mix the ore-powder with any plastic material—such as cement, clay, mud, peat, or sediment of sewage—adding, in some cases, lime, to increase cohesion, and combine with sulphur or carbonaceous matter—such as coal, coke, or charcoal in the form of dust or powder—to aid reduction. As, however, the reduction may be entirely effected, as I will explain, by the agency of carbonic oxide, the mixture of the carbonaceous matter is not essential. On the other hand, when enough carbon is intermixed with the ore, the carbonic oxide may be partially or wholly dispensed with. When lime is employed along with clay these ingredients should be so proportioned as to constitute a refractory mixture resisting fusion. These materials are thoroughly mingled together by any known method of pugging, so as to form a cohesive compound like bricks in their moist condition; and the compound may be molded into bricks, or may be simply extruded from the pug-mill in lumps of irregular form and dimensions. These bricks or lumps, without any drying being required, are charged into a cupola or tall furnace, of the kind represented in the accompanying drawings, of which Figure 1 represents a part vertical section and part side elevation, showing the reducing chamber or cupola A B, with chambers H J and F G at its one side, for producing hot carbonic oxide, or flame containing no free oxygen; it being understood that other chambers like H J and F G may be applied also at the other side of A B. The outer chamber H J is charged with coke or other fuel, and closed at the top, and, the fuel being ignited at the bottom, has a blast of air directed on it by tuyeres, which open into a hollow ring, D E L, of trough shape in section, surrounding the lower part of the chamber, this ring having the effect of distributing and equalizing the blast from the tuyeres. From the combustion of the fuel in the lower part of H J a gaseous mixture containing hot carbonic anhydride and nitrogen is produced, which, as it cannot escape at the top of the chamber, is forced, by the pressure of the blast, through the lower part of the next chamber F G, and this chamber being also charged with coke and closed at the top, the carbonic anhydride, in its passage through it, becomes mostly converted into carbonic oxide, which, with the nitrogen and other gases, passes in a highly-heated state into the reducing-chamber A B, and ascends through and among the bricks or lumps of ore compound therein. C C' are the passages at the bottoms of the chambers, which are preferably repeated, along with chambers corresponding to F G and H J, at the opposite side of the reducing-cupola A B, so that the two opposite blasts of hot deoxidizing gases meet in the cupola, and ascend therein together. The bottom of the cupola A B is extended downward to a considerable depth, so as to form a cooling cylinder or well, R K. For more effectually cooling the contents of this well, and at the same time utilizing a portion of the heat given off by them, I prefer to inclose it in an outer casing, which may be of masonry, as shown in Fig. 1, and in the annular space surrounding the well I fit a helical partition, S S. I force a blast of air into the lower convolution of the helical passage thus formed, and the air, ascending helically, cools the well, and becomes itself heated, finally passing, by a pipe, W, to the tuyeres of the chamber H J, which it enters as a hot-blast. The hot carbonic oxide acts in the cupola A B, both by its heat, and also by its reducing qualities, on the ore in the compound, which becomes reduced, and descends in a pulverulent condition along with the other ingredients of the compound into the well R K, where the whole becomes cooled without access of air. Portions of the cooled matter are removed from time to time through a door, Z, which is thereupon tightly closed, and fresh charges of the bricks or lumps of compound are introduced at the top of the cupola A B. The hot gases which effect the reduction at the lower zone of the cupola in their ascent serve to heat up and to dry the compound above before it descends to the reducing-zone.

Instead of extending the bottom of the reducing-cupola to a considerable depth, for the purpose of cooling the contents, as I have described with reference to Fig. 1, it may be constructed, as shown in section at Fig. 2, with a bottom tapering to a small outlet governed by a valve at E. In order in this case to reduce the products of the cupola to powder, or to fragments small enough to pass through E, I provide a number of bars at C D, having the shape of a cross in their transverse section, as shown more clearly in Fig. 3, or having ribs projecting along their sides, and I cause these bars to revolve by gearing B', which is inclosed in an outer casing, and driven by a shaft passed through the side of the casing, with packing to prevent access of air.

The bars C D, being caused to revolve slowly, crush the lumps resting on them, the fragments or powder of which can, from time to time, be permitted to issue, by the passage E, into trucks or vessels that are tightly closed, and removed to a convenient position for cooling. In charging such trucks or vessels it is advisable to squirt into them a small quantity of petroleum or other liquid hydrocarbon, to produce gas or vapor for the expulsion of air from them.

The matter removed from the reducing-cupola in a cool state consists of the lumps or bricks in fragments or powder dried and baked, with the metallic iron interposed in pulverulent form throughout the mass. I break and grind these lumps so as to reduce them to powder, and separate the metal from the earthy matters by winnowing—that is to say, subjecting the powdered products to a blast of air, whereby the lighter particles are carried to a distance, the heavier metallic particles being deposited near the point where the blast is applied. When clay and lime are used in suitable proportions in compounding the bricks or lumps, these ingredients are, by the winnowing, separated in condition to form a good cement, which may be used for building purposes, or may be employed again in agglomerating ores to be treated. In order to collect the lighter products of the winnowing with little waste, a porous screen should be provided at the end of the winnowing-chamber, to permit the passage of air through it while it retains the solid particles. The pulverulent iron or steel thus separated may be treated by heat either for the production of wrought-iron or of steel or steely iron. In the former case it is made up into lumps with plastic clay and other fluxes, but without carbon, the fluxing ingredients being so proportioned that they shall not melt until the welding-heat of the iron is reached, after which the slag serves to protect and glaze the iron. The iron is then "rabbled" or otherwise worked into a "bloom," and subjected to further treatment by squeezing, hammering, or rolling in the usual way. In the other case the pulverulent iron is melted in a bath of fused pig-iron, so as to produce steel or steely iron, according to the proportion of the pure iron to the pig-iron, the latter containing a known percentage of carbon.

If, in conducting the reducing process as above described, the iron ore be compounded with excess of carbonaceous matter, and its exposure in the reducing-cupola without increased temperature be prolonged, the iron produced in the lumps will undergo a process of cementation, absorbing carbon so as to be converted into steel; and in like manner pulverulent iron, however produced, can thus be converted by making it up into lumps along with carbonaceous matter, and exposing it to the action of a non-oxidizing flame. When the lumps so treated are removed from the cupola, and have the metal separated from all redundant carbon, it possesses the character of blister-steel, and requires only to be melted in order to become cast-steel. To effect this melting most easily the metal so separated is made up into lumps with plastic fluxing materials, and subjected to the heat of a non-oxidizing flame in a vertical blast-furnace, or in a reverberatory or other furnace, in which no solid carbonaceous matter can come in contact with it, and is thus fused into cast-steel, which, falling to the bottom of the furnace-hearth, covered by the molten slag, can be run into ingots or other molds in the usual way. In compounding the steel for this purpose the fluxes should be so proportioned that their fusing-point is about or slightly above that of the steel. The duplex furnace described in the specification to Letters Patent applied for by me at this date is suitable for such steel melting, as it provides the non-oxidizing flame without contact of the fuel. The method of reduction described for iron with the same arrangement of reducing-furnace, is applicable also in the reduction of copper, zinc, antimony, and other metals. The pulverulent metal so obtained can be separated by winnowing, as described above, or in the case of the less oxidizable metals by washing. These reduced metals, when thus cleansed of impurities, can also be made into lumps with fluxes adjusted in their melting-points to suit each metal, and melted as described above, or the melting may be effected in any known way.

When iron is produced in this manner in admixture with other metals, as in the reduction of copper pyrites, which produces both iron and copper in the pulverulent form, a magnetic separator may be employed, as for metal filings.

In the reduction of zinc and other volatilizable metals the top of the reducing-chamber should be made to communicate with a condensing-chamber, in which the sublimed metal will be collected.

It is advantageous to combine the reduction of zinc ore with that of iron ore by making up lumps containing both ingredients, and treating them as above described, the zinc being in this case sublimed and collected as a powder in the condensing-chamber, while the pulverulent iron is withdrawn at the bottom of the reducing-chamber.

Having thus described the nature of my invention, and the best means I know of carrying the same into practical effect, I claim—

1. The process, substantially as herein described, of producing pulverulent metal direct from ore by exposing bricks or lumps compounded of ore and agglutinating material to the action of hot gases or of flame, free from oxygen, such hot gases or flame being brought to bear upon the said compounded lumps in a common vertical blast-furnace shaft, by being forced upward among the lumps as a hot-blast from any convenient combustion-chamber or furnace, external to, but in air-tight communication with, the bottom of such blast-furnace, as and for the purposes described.

2. The process, substantially as herein described, of producing steel direct from iron ore or from pulverulent iron, by exposing lumps compounded with carbonaceous matter and powdered iron ore, or with carbonaceous matter and pulverulent iron, to cementation by means of heat imparted to the lumps by means of a non-oxidizing flame forced through them in the common vertical blast-furnace shaft, and fusing the same after cooling, and after the perfect removal of all redundant carbon by the winnowing-blast, by compounding the pulverulent steel with fluxes, as described, and effecting the fusion by flame, in a common vertical smelting-furnace, such flame being supplied in the manner described.

In testimony whereof I have signed my name to this specification in the presence of two subscribing witnesses.

W. A. LYTTLE.

Witnesses:
J. B. WYNN,
JNO. P. M. MILLARD.